Aug. 4, 1953     J. N. GOOD     2,648,011
APPARATUS FOR ELECTRONIC SPECTROMETRIC ANALYSIS
OF BACK-REFLECTION DIFFRACTION
Filed Aug. 16, 1951     2 Sheets-Sheet 1
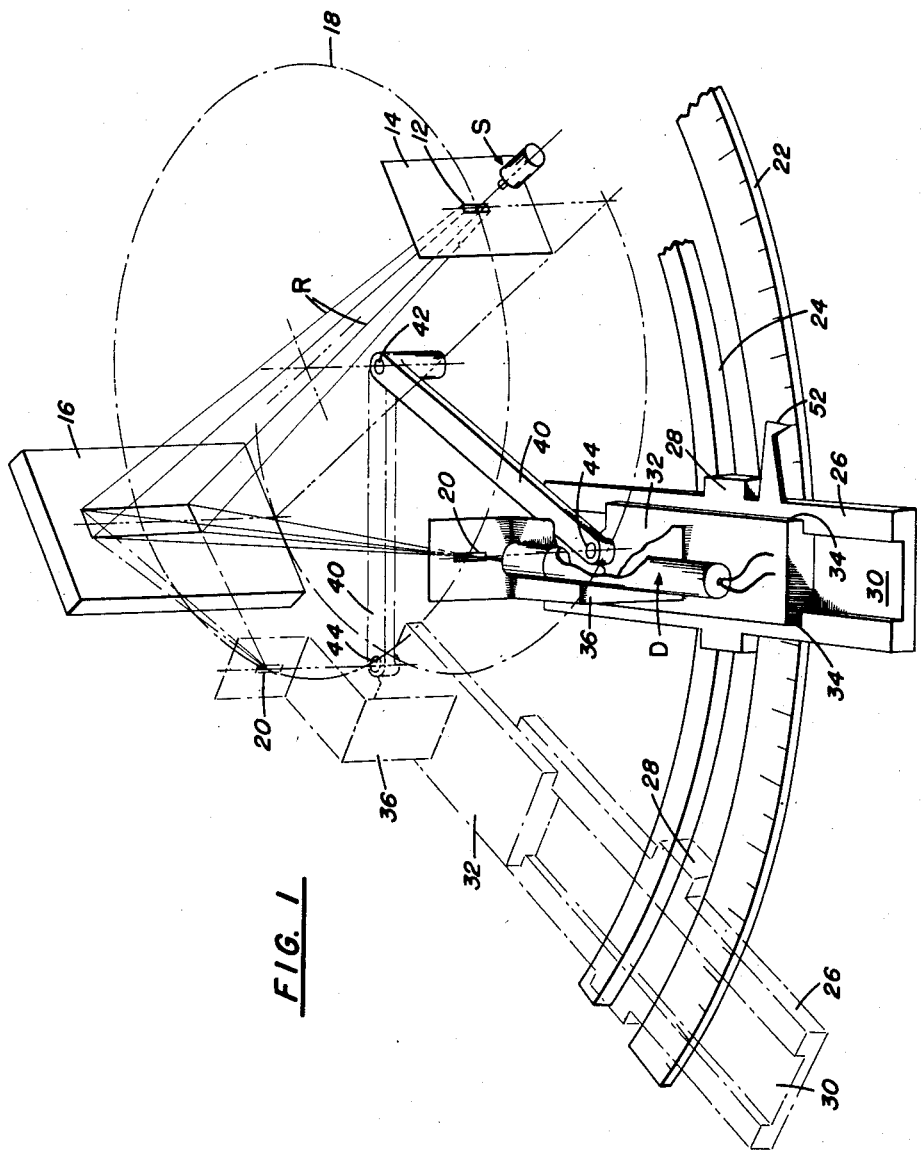
INVENTOR.
JAMES N. GOOD
BY *T. J. Schmitt*
*Walter S. Pawl*
ATTORNEYS

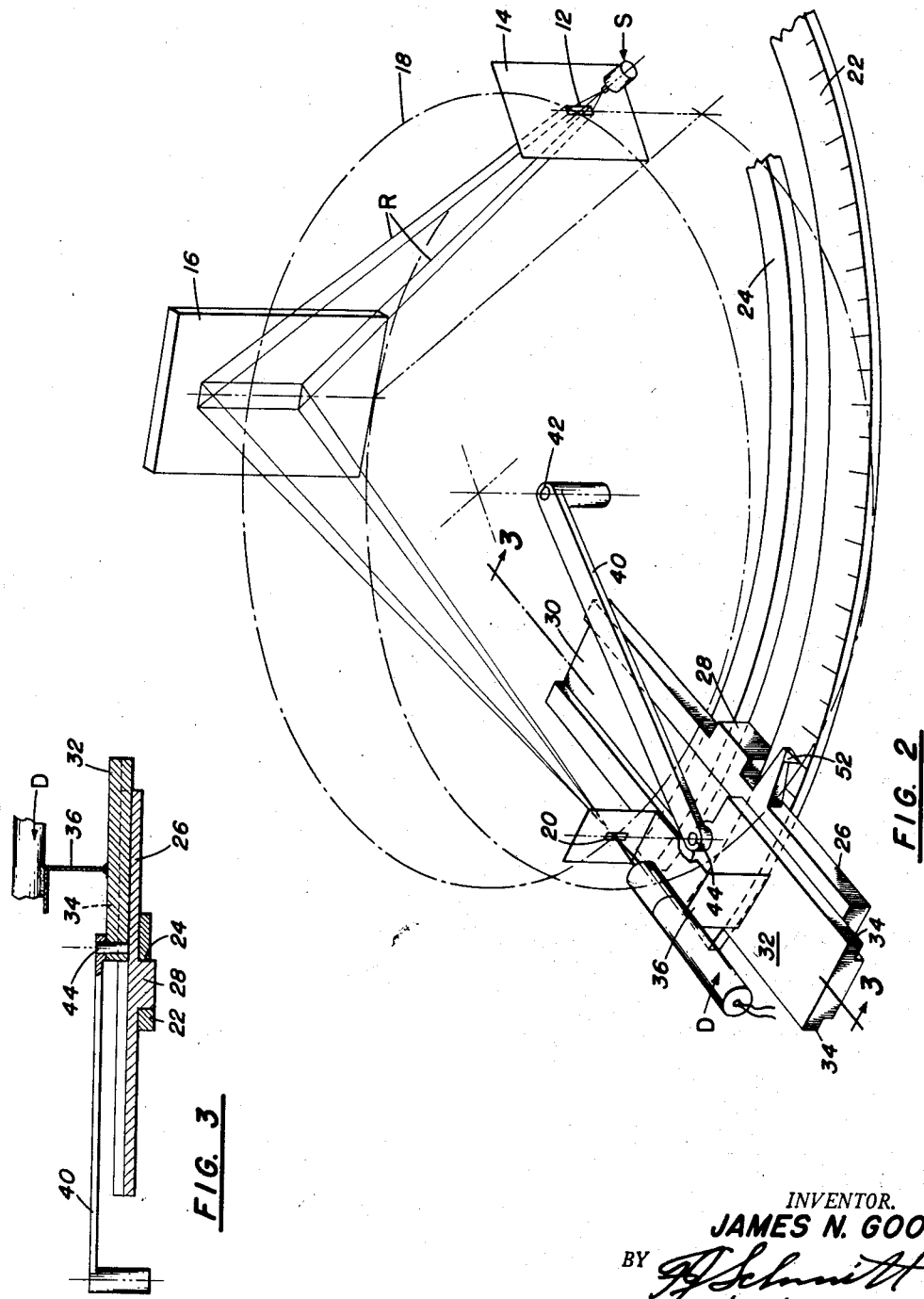

Patented Aug. 4, 1953

2,648,011

UNITED STATES PATENT OFFICE 2,648,011

APPARATUS FOR ELECTRONIC SPECTRO-
METRIC ANALYSIS OF BACK-REFLEC-
TION DIFFRACTION

James Nathan Good, Lafayette, Ind.

Application August 16, 1951, Serial No. 242,167

5 Claims. (Cl. 250—52)

(Granted under Title 35, U. S. Code (1952),
sec. 266)

The invention relates to a novel apparatus for electronic, spectrometric analysis of back-reflection diffraction.

The primary object of this invention is to provide an apparatus for and a method of stress determination by electromagnetic wave energy, for example X-ray, of an object without destroying the object and while the object is maintained in a stationary position.

Another object of the invention is to provide a mechanism for constraining a wave energy receiving detector of known type to lie always on a great focus circle tangent to the irradiated surface of the test specimen by constraining with a circular or arcuate support whose center of curvature is at the irradiated surface, a radially movable carriage carrying the detector, the carriage being further constrained in its radial movement by a link which is connected at a centro with the carriage and pivoted at the center of the great focus circle of the focus sphere to which the specimen is tangent.

Ancillary objects will be come apparent in following the description of the drawings wherein:

Fig. 1 is a perspective view of the apparatus, some of the elements being shown schematically, the irradiated surface being shown in a position normal to the center line of diverging electromagnetic waves, while two of a great number of possible positions of the detector are shown for the resulting focus circle;

Fig. 2 is a perspective view of the apparatus in Fig. 1, but shows the irradiated surface located in a position 45° rotated from the center line of diverging electromagnetic waves, while one possible position of the detector is shown for the resulting great focus circle, tangent to said surface at a point center of contact by the wave energy, and Fig. 3 is a sectional view of the carriage and its support subassembly, this view being taken on the plane of line 3—3 of Fig. 2 and in the direction of the arrows.

Materials in the solid class, for example various metals and alloys such as used in aircraft power plants, have presented problems in failure as a result of stresses, vibrations, crystalline structures being weaker than others, and for other reasons. Stresses and vibrations have long been a standing challenge to detection, measurement and dissolution. In many instances the existing methods of measurement require destruction or serious mutilation of a material, and sometimes without producing any reliable results.

The search for a more flexible list of methods of investigation has in recent years brought forth the science and technique of diffraction by employing electromagnetic wave energy. In particular X-ray diffraction has many possibilities of advantage in the basic study of stresses or strains, vibration and other physical states within the atomic structure of an object used as a specimen.

From basic theory it is known that the angle made with an irradiating beam by any component of a diffraction spectrum is determined by the small magnitude of the space between layers of atoms in a material. As the solid is stressed, the angle changes as the atomic spacing changes with compression and tension. The precision and accuracy required in the measurements have placed limitation on the use of photographic recording of the diffraction spectra. More sensitive electronic or electrical detectors have been developed and applied which are applicable only to small rotating specimens. My invention provides for the application of such detectors principally, although photoelectric-type radiation recording means may be used, to materials of various sizes and degree of mobility.

Moreover, these known detectors can be made to analyze directly, intensity distributions in diffraction spectra as well as angular displacements. The occurence of distortion of angular displacements is well known where diffraction is attempted of highly-alloyed, hardened or deformed metals. The development of the detectors will have the added advantage of detection or resolution of the source of distortion strains in the atomic lattices in such metals, of measurement of the magnitudes of the associated stresses by accurate measurement of said intensities, and of any other variable diffraction characteristics. Such an instrument can be applied also to the basic studies of many other problems concerning the atomic structures in solids; for example, in thermal distortions in hot disk rims, in fatigue fracture, in phase-changing cracking, or in metallic creep and flow. A number of diffraction subtelties, evidences that have been too diffcult for concrete handling in the past, are becoming useful as tools in the basic research on or routine control of solids with the detector.

The illustrated device is a structural embodiment of the invention which places a sensitive detector on a focus circle and simultaneously, at any angle with the irradiating beam, irradiating a specimen that may remain always in a fixed position. The detector may operate in a range limited only by the increase in size of the focus circle to a point where the air path-length of diffracted rays is prohibitive. Maintaining the position of the detector on a focus circle permits the use of a fixed-specimen position, which in turn allows large bodies to be examined.

In Figs. 1 and 2, typical arrangements are illustrated. In each instance there is a source S of electromagnetic wave energy, for example an X-ray machine which includes among other elements, an emission slit or opening 12 in a plate 14, the slit and plate being separated from the source S, shown schematically. The object 16 which constitutes a specimen, has an irradiated surface tangent to a great focus circle 18 of the focus sphere, and the back reflection therefrom is received in the detector D, which includes a receiving opening or slit 20 separated from the body of the detector D, shown schematically. The detector D is maintained always on the focus circle 18.

The detector D is supported by a means constraining the motion thereof so as to retain the detector D always in contact with focus circle 18. This means includes a track or support 22 having a slot 24 which is preferably arcuate in form; and the center of curvature of the slot 24 is at a point defined by the center of contact by the rays R, from the source S, with the irradiated surface of the object 16 at a point of tangency with the focus circle 18. The support 22 is calibrated in degrees of arc to facilitate its use.

A bed plate 26 has a means slidingly connecting it to the support 22, the latter means comprising a slide 28 which is located in the slot 24. It is preferable, although not essential, that the slide 28 depend from the lower surface of the bed plate 26, while the upper surface of the bed plate 26 is provided with a guideway 30 in which a carriage 32 is disposed. An assembly such as this should be precision made with substantially no lost motion and therefore the bed plate and carriage may be engaged by dovetail and slot, tongue and groove or over-resting flange 34 connections.

Since a bracket 36 fastens the detector D to the carriage 32, any movement of the carriage causes a corresponding movement of the detector. Accordingly, in order to constrain the motion of the carriage 32 and hence the detector D to lie always facing the irradiated surface of the object 16 and contacting the focus circle 18, a link 40 is pivoted at one end about a pin 42 as an axis, the axis being normal to the plane of the guideway 30, and is connected at a center, passed through the pivot pin 44.

In operation an object to be subject of analysis is selected. The object 16 may be a small specimen which is easily moved, or, in use of the described apparatus, may be a stationary object, as a beam in a building or an extremely heavy casting such as an engine block. The source S is set into operation so that the rays traverse a diameter (Fig. 1) of the focus circle (or the focus sphere). The rays R strike the irradiated surface of the object 16 at points of near tangency and at the center point of actual tangency when the surface is normal to the irradiations. The rays are diffracted by the object and traverse a chord of the great focus circle 18 when observed in the plane of the circle. Maximum resolution of the defraction spectra is obtained regardless of the length of the chord by restraining the receiving slit 20 to the circumference of the circle 18.

The restraint of the slot 20 is accomplished by the presence of the link 40 which is pivoted at the center of the circle 18 and to the carriage 32. In as much as the carriage is mounted displaceably in the guideway 30 and the guideway has its longitudinal axis on a radius of the slot 24, no matter where the bed plate 26 is moved in its support 22, the detector D will always remain on the circle 18. By having the bed plate 26 and carriage 32 movable, but constrained in movement, diffraction at many angles, as indicated by the pointer 52, may be analyzed while the object 16 need not ever be moved. Such movement to observe spectra from any angle is indicated by the dotted line showing in Fig. 1.

Although the arrangement in Fig. 2 includes the same elements as in Fig. 1, the source S in Fig. 2 is so located with respect to the object 16 that the incident rays R traverse a chord of the focus circle. The object 16 is placed at 45° to the incident rays R however, the object may be placed at any other angle to the rays which may be reasonably used. The requirement of tangency of the focus sphere with the object 16 enlarges the great focus circle, so that the slit 12 directs rays from the source S across a chord of the focus circle to strike the object at or very near the real point of tangency of the irradiated surface with the focus sphere great circle.

In either the arrangement of Fig. 1 or 2, the constrained motion of the carriage is obtained in the same way. After the support is located, as by placing it on a table, and the source S rendered operative, the bed plate is moved to the desired position on the support, for example from the phantom line position of Fig. 1 to the full line position. The bed plate must move in an arc of a circle whose center is at the irradiated surface of the object 16 for reasons previously described. At the same time, the carriage 32 is slid in the guideway 30 in such direction as to retain the detector D in contact with the focus circle 18, by the action of the link 40, one end of which has a fixed pivot at the center of the focus circle and the other end of which is pivotally movable on its pin 44.

It should be understood, of course, that the foregoing disclosure relates to only a preferred embodiment of the invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

I claim:

1. In an assembly for spectrometric diffraction analysis which assembly includes a wave energy source and a detector adapted to receive the wave energy after it has been diffracted from an object, means for mounting the detector on the circumference of a great focus circle of a focus sphere of diffracted radiations from the object, said means including a track having a curvature located on a circle whose center is at the object, a bed plate slidable in said track and having a guideway radially disposed relative to said circle, a link pivoted at one end at the center of said great focus circle, a carriage disposed in said guideway and assembled at a centro connection with said link, and means carried by said carriage for supporting said detector.

2. In a materials testing apparatus, a device to emit electromagnetic waves upon a stationary object spaced from said device, said object having an irradiated surface located tangent to a great focus circle, said device being located on said great focus circle, a detector for back reflection diffraction patterns, a carriage upon which said detector is carried, means operatively connected with said carriage for retaining said carriage in such position as to always retain said detector on said circle, said means including a bed plate, an arcuate track having a center of curvature at said irradiated surface, said bed plate being slidably disposed in said track, said carriage being radially movable relative to said circle and carried by said bed plate, and means connected with said carriage for moving said carriage radially of said circle in response to movement of said bed plate to retain always said carriage in such position that the detector which is carried thereby is located on said focus circle.

3. In a materials testing apparatus, a device to emit electromagnetic waves upon a stationary object spaced from said device, said object having an irradiated surface located tangent to a great focus circle, said device being located on said great focus circle, a detector for back reflection diffraction patterns, a carriage upon which said detector is carried, means operatively connected with said carriage for retaining said carriage in such position as to always retain said detector on said circle, said means including a bed plate, an arcuate track having a center of curvature at said irradiated surface, said bed plate being slidably disposed in said track, said carriage being radially movable relative to said circle and carried by said bed plate, means connected with said carriage for moving said carriage radially of said circle in response to movement of said bed plate to retain always said carriage in such position that the detector which is carried thereby is disposed on said focus circle, said carriage moving means comprising a link mounted pivotally at one end at the center of said great focus circle, and the opposite end of said link being pivotally connected with said carriage.

4. In an apparatus for analyzing back reflection diffraction energy waves from an irradiated surface which is retained tangent to a great focus circle, a bed plate provided with a guideway having a longitudinal axis, means supporting said bed plate for such arcuate movement in a single plane so that said axis is always aligned with said irradiated surface, a carriage mounted in said guideway for motion parallel to said axis, means carried by said carriage for supporting a diffraction energy wave detector, and means connected with said carriage for constraining the movement thereof such that the arcuate movement of said carriage is restricted to an arcuate path coincident with an arc of said great focus circle.

5. In an apparatus for analyzing back reflection diffraction energy waves from an irradiated surface which is retained tangent to a great focus circle, a bed plate provided with a guideway having a longitudinal axis, means supporting said bed plate for such arcuate movement in a single plane so that said axis is always aligned with said irradiated surface, a carriage mounted in said guideway for motion parallel to said axis, means carried by said carriage for supporting a diffraction energy wave detector, means connected with said carriage for constraining the movement thereof such that the arcuate movement of said carriage is restricted to an arcuate path coincident with an arc of said great focus circle, the last mentioned means comprising a link pivoted at one end to said carriage and pivoted at the other end at the center of said great focus circle for movement about an axis normal to said single plane.

JAMES NATHAN GOOD.

References Cited in the file of this patent

UNITED STATES PATENTS

| Number | Name | Date |
|---|---|---|
| 2,452,045 | Friedman | Oct. 26, 1948 |
| 2,474,240 | Friedman | June 28, 1949 |
| 2,474,835 | Friedman | July 5, 1949 |
| 2,514,382 | Friedman et al. | July 11, 1950 |
| 2,532,810 | Harker | Dec. 5, 1950 |
| 2,540,821 | Harker | Feb. 6, 1951 |